(No Model.)
W. E. THOMPSON.
BICYCLE.
No. 447,382. Patented Mar. 3, 1891.
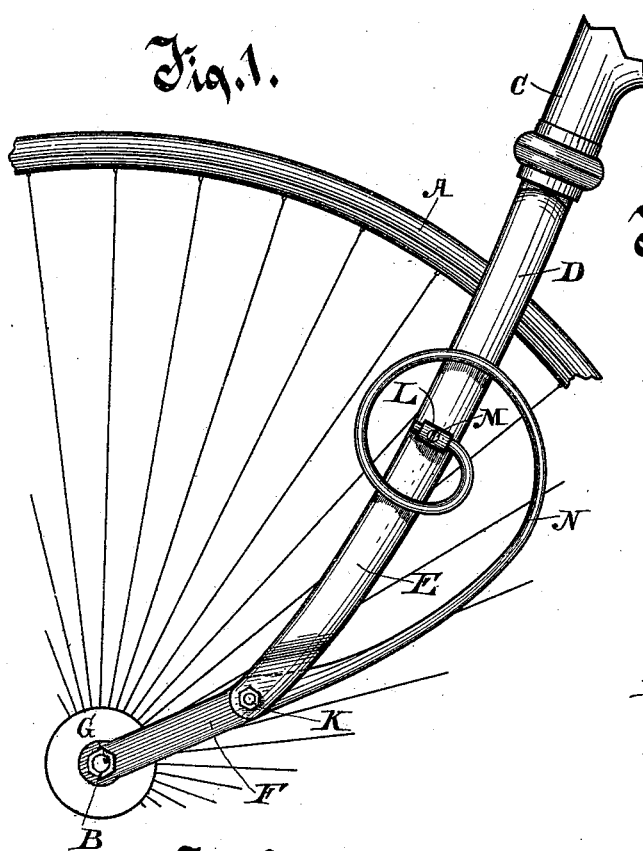
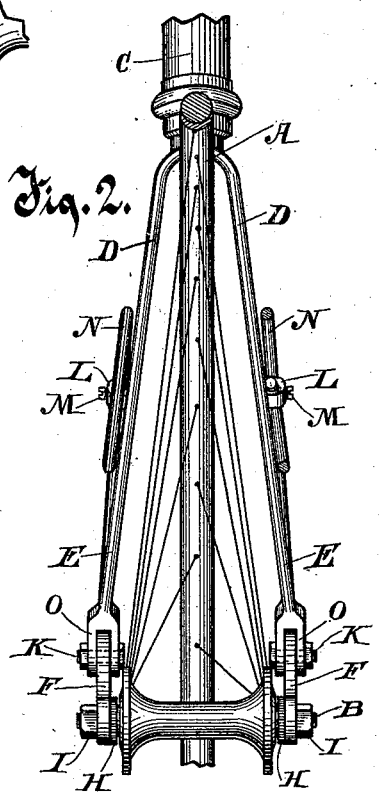
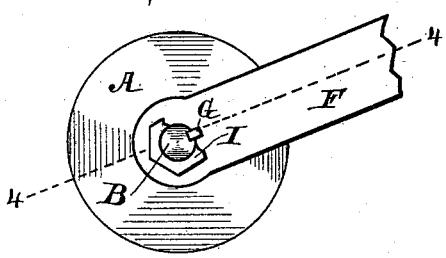
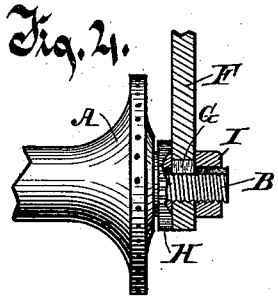
Witnesses.
C. H. Keeney.
Anna O. Faust.
Inventor.
William E. Thompson
Curtis T. Benedict
Attorney.
THE NORRIS PETERS CO., PHOTO-LITHO., WASHINGTON, D. C.

UNITED STATES PATENT OFFICE.

WILLIAM E. THOMPSON, OF MILWAUKEE, WISCONSIN.

BICYCLE.

SPECIFICATION forming part of Letters Patent No. 447,382, dated March 3, 1891.

Application filed November 1, 1890. Serial No. 370,071. (No model.)

*To all whom it may concern:*

Be it known that I, WILLIAM E. THOMPSON, of Milwaukee, in the county of Milwaukee and State of Wisconsin, have invented a new and useful Improvement in Bicycles, of which the following is a description, reference being had to the accompanying drawings, which are a part of this specification.

My invention relates to the novel construction of the backbone-supporting fork that straddles the front wheel of a bicycle; and the invention consists in a fork constructed of a minimum number of parts necessary to support yieldingly the backbone and seat thereon in such a manner as to, so far as is possible, prevent the jar and vertical motion of the wheel, caused by passing over stones or other inequalities on the track, from being transmitted to the rider.

In the drawings, Figure 1 is a fragment of the front wheel of a bicycle with my improved fork attached thereto. Fig. 2 is a front view of the same fragment of a wheel and the fork shown in Fig. 1. Fig. 3 is an enlarged view of the lower end of one leg of the fork, showing its connection to the axle of the front wheel of the bicycle, parts being broken away to show rear construction. Fig. 4 is a front view of the same parts shown in Fig. 3, portions being broken away and shown in section to exhibit interior construction.

The bicycle-wheel A is loose on its axle B. My improved fork consists of the stem C of the fork and the legs D D. The legs of the fork are each formed in two parts E and F. The parts E at their upper extremities are affixed to or made integral with the stem C. At their lower extremities the parts E E are pivoted to the parts F F at a distance from the axle B, the parts F F being at their lower extremities secured rigidly to the axle B conveniently by receiving the axle therethrough and being secured thereon against rotation by keys G G and against movement endwise thereon by being placed against collars H H, made permanent on the axle, and nuts I I, turned on the axle against the parts F F on the outside. The parts F F are continued beyond the points K K, at which they are pivoted to the parts E E, projecting upwardly and rearwardly a distance therefrom, and are then curved over toward and are secured to the parts E E conveniently by being inserted in brackets L L rigid on the parts E E, and are secured therein by set-screws M M, turning through the brackets against the extended portions of the parts F F. These extended portions of the parts F F upwardly beyond the pivotal point K are elastic, and form springs N N, which are adapted to hold the two parts E and F of the legs of the fork yieldingly in position relative to each other. As the general direction of the fork is upward and rearwardly in an oblique direction from the supporting-axle B, it will be understood that any slight vertical motion or sudden jar given to the wheel will be modified by the action of the springs, so that the motion or jar will not be transmitted in its intensity to the rider in his seat on the backbone supported on the fork.

A desirable method of connecting the parts E E to the parts F F is shown in Figs. 1 and 2, which consists in constructing the lower extremities of the parts E E with bifurcate ends O O, forming sockets, in which parts F F are pivoted by means of bolts passing through them at K.

What I claim as new, and desire to secure by Letters Patent, is—

1. A bicycle-fork having legs formed in two parts pivoted together at a distance from the supporting-axle, the lower parts of the legs being continued upwardly beyond the pivotal points, which continuations of the lower parts are elastic and form springs connected rigidly at their upper extremities to the upper parts of the legs of the fork, substantially as described.

2. In a bicycle, the combination, with a wheel and its axle loose therein, of a fork supported on the axle, the legs of which fork are constructed in two parts pivoted together, the lower parts being continued upwardly and secured at a distance from their pivotal points to the upper parts, forming springs integral with the lower parts of the legs, adapted to support the legs yieldingly, substantially as described.

3. In a bicycle, a fork having legs in two parts, the upper parts of which, E E, have bifurcated lower extremities O O, in combination with lower parts F F of the legs, secured rigidly to the axle of the wheel and pivoted at a distance therefrom in the bifurcate extremities O O to the parts E E, and springs N N, integral with the parts F F, projecting upwardly therefrom, and secured rigidly at their upper ends to the parts E E, substantially as described.

In testimony whereof I affix my signature in presence of two witnesses.

WILLIAM E. THOMPSON.

Witnesses:
C. T. BENEDICT,
ANNA V. FAUST.